United States Patent [19]

Kachajian et al.

[11] Patent Number: 4,498,449
[45] Date of Patent: Feb. 12, 1985

[54] PRECISION TENSIONING DEVICE FOR ID SAW BLADE

[75] Inventors: George S. Kachajian, Franklin Lakes; Robert E. Steere, Jr., Boonton; Wesley Charles, Pompton Lakes, all of N.J.

[73] Assignee: Silicon Technology Corporation, Oakland, N.J.

[21] Appl. No.: 365,301

[22] Filed: Apr. 5, 1982

[51] Int. Cl.³ .............................................. B28D 1/04
[52] U.S. Cl. ...................................................... 125/15
[58] Field of Search .................... 51/73 R; 125/15 R; 254/100

[56] References Cited

U.S. PATENT DOCUMENTS

| | | | |
|---|---|---|---|
| 1,828,913 | 10/1931 | Toomey | 254/100 |
| 2,393,795 | 1/1946 | Miller | 254/100 |
| 3,254,641 | 6/1966 | Blaine | 125/15 |
| 4,151,826 | 5/1979 | Otte | 125/15 |

FOREIGN PATENT DOCUMENTS

| | | | |
|---|---|---|---|
| 156382 | 11/1977 | Japan | 125/15 |
| 426841 | 12/1974 | U.S.S.R. | 125/15 |

Primary Examiner—Harold D. Whitehead

[57] ABSTRACT

An improved tensioning device is provided for use in an inner diameter saw blade housing. A tensioning ring, disposed in an annular clamping member, is internally threaded at plurality of locations along its circumference. An associated plurality of screws, disposed in cylindrical recesses in the clamping member, threadedly engage the internal threads. The screws may be turned through an opening in the clamping member having a diameter smaller than the screw to thereby precisely tension the blade as desired. Since the screws are captive within the clamping member, migration of the tensioning ring relative to the blade is prevented. Further, the screws do not protrude from the surface of the clamping member and the threaded portions of the screws are closed off from the ambient such that foreign matter cannot enter the clamping member and interfere with the tensioning process.

3 Claims, 3 Drawing Figures

PRECISION TENSIONING DEVICE FOR ID SAW BLADE

DESCRIPTION OF THE INVENTION

The present invention relates generally to article tensioning devices, and in particular to a precision tensioning device for an inner diameter (ID) saw blade.

Recently, there has been an increasing need for extremely thin sections or wafers of silicon. For example, in the electronics industry, extremely thin slices of silicon, on the order of 0.007 inches in axial dimension, have been used, usually cut from larger silicon crystals which can be economically grown, and then sawed into wafers of the required thickness.

Naturally, in view of the great expense of the raw silicon meterial, minimization of waste of the silicon is of prime consideration, as is uniformity of size and surface configuration of the wafers which are often as large as five inches in diameter. In order to provide the wafers of the required size and surface characteristics, while also minimizing waste, special cutting blades have been devised for slicing silicon wafers from larger ingots.

One of the required characteristics of the cutting blades is that they must be thin enough to produce the required thin wafer while minimizing waste, and must also have rigidity sufficient to slice through a 3 to 5 inch diameter silicon crystal. This combination of thinness and rigidity is generally not attainable with the usual cutting blade where the cutting surface is on the outside circumference thereof.

As noted in the U.S. Pat. Nos. 3,827,421; 4,014,311; 4,135,499; and 4,151,826, for example, all assigned to the assignee of the subject application, a cutting blade which provides the required thinness and rigidity with the required cutting depth capability is a thin, circular saw blade clamped about its outside diameter, and including an opening centrally therein forming an inner diameter blade, hereinafter referred to as an "ID" blade. Blade mounts, or tensioning devices are annular mechanical devices which grip the outer circumference of the blade and create tension within the body of the blade, thereby to support the edge of the central opening. By such a mounting arrangement, the cutting surface has the required rigidity and concentricity to produce uniform results and means are provided to hold the blade in a mount which can be rotated at high speeds.

Many of the prior art ID blade mounts tension the blade by means of a hydraulic fluid channel in an attempt to provide the ID blade with uniform rigidity and concentricity. It has been found, however, that despite meticulous precautions in preparing both the ID blades and the blade housing, adjustments more precise than the uniform hydraulic pressure provided by the hydraulic system is in many cases required, where a highly uniform and concentric cutting surface is desired. In such cases, tensioning means which can function to adjust the tension of the ID blade at selected portions thereof, to the exclusion of others, is therefore required.

One such ID saw blade tensioning device is disclosed in the German Offenlegungsschrift No. 28 41 543. In this device, an annular, male tensioning ring is disposed within a clamp ring. The front side of the tensioning ring is convex and is is registry with the ID saw blade. The tensioning ring may be displaced in the axial direction by a plurality of tightening bolts arranged symmetrically at the circumference of the clamp ring. By adjusting the tightening bolts, the amount of tension imparted on the saw blade by the tensioning ring may be varied about the circumference of the clamp ring.

Although the above apparatus can provide precise tensioning of the saw blade about its circumference, it has several drawbacks and disadvantages. First, the tightening bolts disposed symmetrically about the circumference of the clamp ring necessarily project outwardly from the clamp ring, thus presenting a safety hazard to those working near the device since the housing rotates at approximately 3,000 RPM. Secondly, although the tensioning ring is sandwiched between the saw blade and the tensioning bolts, the tensioning ring may tend to migrate angularly and/or radially relative to the clamp ring and saw blade during acceleration and deceleration experienced during the cutting process, since the device provides no means for actively maintaining the tensioning ring stationary relative to the saw blade and clamp ring. Irregularities in the tensioning ring will thus upset the tension of the saw blade as the tensioning ring migrates relative to the saw blade. Finally, spaces or voids between the head of each of the tensioning bolts and the clamp ring are exposed to the ambient. Thus, foreign particles and objects which find their way into such voids can impede precise adjustments.

It is therefore an object of the present invention to avoid the difficulties encountered in the prior art ID saw blade tensioning devices.

It is a further object to provide an ID saw blade tensioning device which allows precise tensioning of the saw blade at selected portions of the circumference thereof.

It is a further object of the present invention to provide an ID saw blade tensioning device which allows precise tensioning at selected portions of the circumference of the saw blade, and which provides means for maintaining the tensioning ring stationary relative to the saw blade.

It is a further object of the present invention to provide an ID saw blade tensioning device which allows precise tensioning of the saw blade at selected portions of the circumference thereof, and which has no tensioning bolts projecting outwardly from the clamp ring.

It is a further object of the present invention to provide and ID saw blade tensioning device which allows precise tensioning and selected portions of the circumference of the saw blade, and which seals the interior portions of the clamp ring from the ambient, whereby foreign particles and objects cannot interfere with the precision tensioning process.

In accordance with an embodiment of the present invention, a precision tensioning device for tensioning a blade to be disposed in the device includes an annular blade clamping member having a first annular blade tensioning member therein for confronting one side of the blade, a second annular blade tensioning member confronting the clamping member and having an annular recess channel therein in radial alignment with the first tensioning member for confronting the other side of the blade. A plurality of screws are provided in the clamping member for operatively moving the first tensioning member axially to engage and deform the blade into the recess channel to thereby tension the blade. The screws are generally disposed within the clamping member to insure that the first tensioning member remains substantially stationary with respect to the blade, and to insure that foreign particles do not prevent the screws from operatively moving the first tensioning member. The screws are disposed completely within the clamping member such that they do not project outwardly therefrom.

In accordance with a more specific embodiment of the present invention, the first tensioning member has internal threads at a plurality of locations on the side of the first tensioning member opposite the blade. The plurality of screws in the clamping member each threadedly engage in a associated one of the internal threads. The screws are disposed entirely within an associated one of a plurality of cylindrical recesses in the clamping member and are engaged with the internal threads in the first tensioning member. Motion of the first tensioning member is thereby restricted by the screws which are captive within the cylindrical recesses. Further, the screws do not project from the surface of the clamping member. The screws include internal sockets and communicate with the surface of the clamping member via an associated one of a plurality of access openings in the clamping member which have diameters smaller than the diameter of the screws but longer than the socket recess. The screws may thus be turned in the internal threads, while at the same time closing off the area within the cylindrical recesses from the ambient.

These and other objects will be discussed in more detail with reference to the following drawing figures of which:

Figure 1:
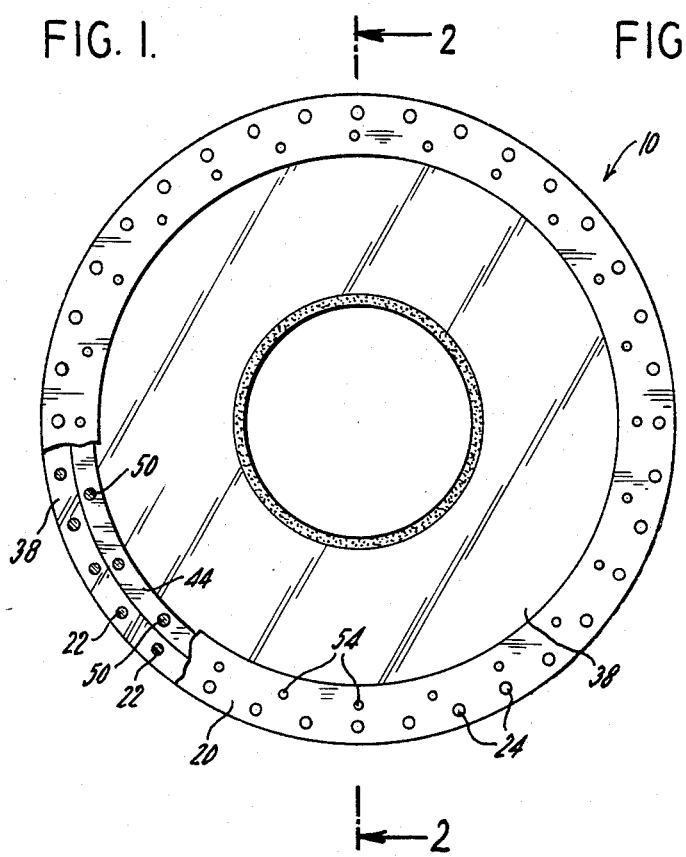
FIG. 1 is a front view of the ID saw blade and saw blade housing in accordance with the invention.
Figure 2:
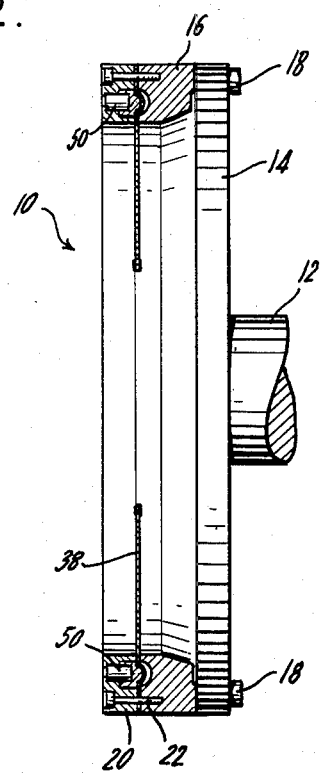
FIG. 2 is a sectional view of the saw blade and saw blade housing of FIG. 1 taken along the line 2—2 of FIG. 1.
Figure 3:
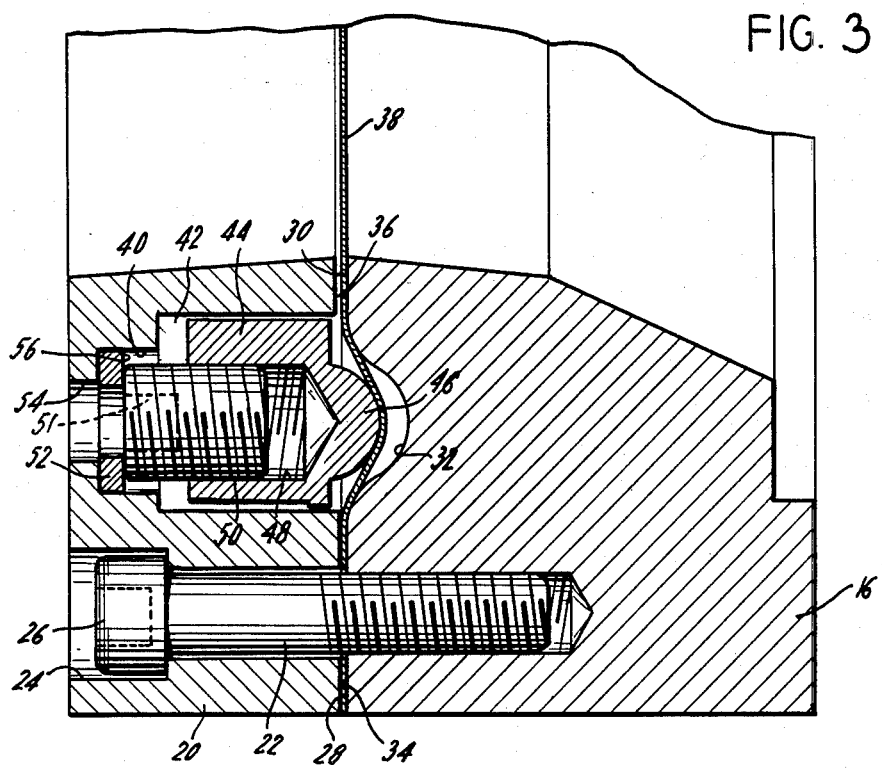
FIG. 3 is an enlarged partial sectional view of the saw blade and saw blade housing of FIG. 2.

Referring now to FIGS. 1 through 3, a saw blade housing generally designated by reference numeral 10 is attached to the drive shaft 12 of a slicing machine (not shown). It should be understood that while the blade tensioning device of the present invention is described as usable with an ID cutting blade for slicing thin sections of crystal, such use is merely an illustrative example of one application of the present invention, other applications being possible and within the scope of the present invention.

Spindle plate 14 is attached to drive shaft 12 in a well-known manner. A generally cylindrical, annular female tensioning ring 16 is attached to the spindle plate 14 by tensioning ring bolts 18. The tensioning ring bolts 18 are equally spaced along the circumference of spindle plate 14 to thereby securely attach tensioning ring 16 to spindle plate 14.

A generally cylindrical, annular clamping ring 20, of approximately the same diameter as tensioning ring 16, is attached to tensioning ring 16 by clamping bolts 22, which are disposed within cylindrical recesses 24 in the clamping ring, and are equally spaced along the circumference thereof. Each clamping ring bolt 22 is provided with a socket head 26 fully disposed within recess 24 such that no portion of bolt 22 protrudes from the surface of clamping ring 20.

Female tensioning ring 16 includes a clamping surface 28 and a non-clamping or clearance surface 30 radially inward from clamping surface 28. A circumferential, annular tensioning ring recess 32 is provided in the tensioning ring radially between the clamping and non-clamping surfaces 28 and 30.

Clamping ring 20 includes a radially outer clamping surface 34 axially adjacent clamping surface 28 on tensioning ring 16, and a non-clamping or clearance surface 36 axially adjacent the non-clamping surface 30 on tensioning ring 16. Annular saw blade 38 is positioned between clamping ring 20 and tensioning ring 16 and is fixedly secured between clamping surfaces 28 and 34 under the influence of the force exerted by clamping rings bolts 22 when torqued to an appropriate value.

The construction of the clamping surfaces 28 and 34, and the clearance surfaces 30 and 36 of the tensioning and clamping rings 16 and 20 provides a clearance between the clamped blade 38 and each of the non-clamping surfaces 30 and 36. The clamping and non-clamping surfaces may be formed in any conventional manner in order to axially displace the non-clamping surfaces 30 and 36 with respect to the clamping surfaces 28 and 34.

The clamping surfaces 28 and 34 of the tensioning and clamping rings are axially closer together than clearance surfaces 30 and 36 when the saw blace housing 10 is in its assembled condition. This axial displacement may be accomplished by initially forming the surfaces 28, 30 and 34, 36 of the tensioning and clamping means to be coplaner. Either or both of the clamping surfaces 28, 34 may then be plated with a tough, durable corrosion-resistant material such as nickel or the like, to raise and axially displace the clamping surfaces 28, 34 with respect to the clearance surfaces 30, 36, a sufficient amount to afford clearance of the annular blade 38 between the clearance surfaces when clamped between the clamping surfaces.

Clamping ring 20 is provided with an annular recess 42 located radially inward from clamping ring bolt 22, and axially disposed within the clamping ring from the surface of the clamping ring which interfaces the tensioning ring to a depth of approximately one half the axial thickness of the clamping ring. A plurality of generally cylindrical recesses 40, equally spaced about the circumference of clamping ring 20, extend axially from recess 42 appoximately ⅔ of the distance between recess 42 and the outer surface of clamping ring 20. The diameters of the cylindrical recesses 40 are less than the radial dimension of recess 42.

Male tensioning ring 44, having a protruding rounded portion 46 and a plurality of equally spaced internal threads 48, is disposed within annular recess 42. Tensioning ring screws 50 threadedly engage internal threads 48 in male tensioning ring 44. Each tensioning ring screw 50 is provided with a recessed tightening Allen socket 51 formed in the flat outer end of the screw 50. A cylindrical access opening 54 axially disposed in clamp ring 20 from cylindrical recess 40 to the surface of clamping ring 20, and having a diameter less than the diameter of the screw 50, provides access to the screw. A bearing washer 52 of hard material is positioned in the inner end of the recess 40 and the outer face 56 of the washer 52 forms a bearing surface for the tensioning ring screw 50 as will be described. The diameter of the central opening of the washer 52 is larger than the Allen socket to allow access for adjustment and is smaller than the opening 54 to allow convenient removal and replacement of the washer.

As can be seen in FIG. 3, saw blade 38 is disposed between protruding portion 46 of male tensioning ring 44 and annular tensioning ring recess 32 in female tensioning ring 16. The radially outer portion of the ID blade 38 is held between the clamping surfaces 28, 34, with its righthand surface (as viewed in FIG. 3) abutting the non-clamping surface 30. By virtue of the assembled location of the non-clamping surface 36, the blade 38 does not directly abut surface 36, but a gap on the order of 0.1 to 0.2 mils is provided. Accordingly, the blade is free to be stretched downwardly through this gap upon tensioning of the blade.

Tension imparted on the saw blade 38 may be adjusted by adjusting the axial location of tensioning ring 44. This is accomplished by unscrewing bolt 50 from internal threads 48 of male tensioning ring 44. Since top end of the screw 50 abuts the face 56 of the washer 52, male tensioning ring 44 is forced axially toward female tensioning ring 16 to stretch saw blade 38 with increasing tightness along the radial line extending through the axis of screw 50 as screw 50 is further removed from tensioning ring 44.

Since the blade may selectively be tensioned in radial directions determined by the location of screws, precision tensioning to accommodate imperfections in the saw blade, clamping and tensioning rings may be achieved, the greater the number of screws, the more precision attainable. It has been found that circumferential spacing of about two inches provides sufficient flexibility of adjustment for normal applications.

The precision tensioning device described above provides the following advantages over prior art tensioning devices. First, by providing an internally threaded male tensioning ring 44, into which captive screws 50 are threadedly disposed, migration of the tensioning ring 44 relative to the saw blade 38 is eliminated. That is, since screw 50 is captive within cylindrical recess 40, male tensioning ring 44 is prevented from moving either radially or angularly during the sawing process. This is especially important in precision tensioning devices of the type described herein since it is the selective application of forces at various angles of the saw blade which is desired. In the event that male tensioning ring 44 moves radially or angularly under the influence of high acceleration or deceleration forces experienced during the sawing process, the very precise tensioning of the blade which is desired may be lost.

Secondly, since the screw 50 snugly abuts end wall 56 of cylindrical recess 40, foreign matter will be prevented from entering cylinder 40 or recess 42 and interfering with the precision tensioning process. Further, even if foreign matter does become disposed within either of cylinder 40 or recess 42, such will not impede the precision-tightening process since male tensioning ring 44 is tightened by unscrewing screw 50 from ring 44, rather than by turning screw 50 into tensioning ring 44. In any event, foreign objects will not normally enter the mechanism through the opening 54 and past the top of the screw 50. Furthermore, it has been found that adjustment is both more precise and more permanent with the completely captured tensioning screws as shown and described above than is found in the prior art.

Lastly, bolt 26 and screw 50 are provided with internal sockets and may therefore be disposed fully within clamping ring 20 without axially protruding therefrom, resulting in safer, more reliable operation at speeds in the range of 3,000 RPM.

Thus, the ID saw blade housing in accordance with the present invention can provide extremely precise tensioning of saw blade 38 while maintaining such precision tensioning constant over time during the sawing process. Further the tensioning device is highly reliable since it is effectively sealed off from the ambient, and increases the safety of such devices since it does not require any protruding elements.

As will be readily apparent to those skilled in the art, the invention may be used in other specific forms or for other purposes without departing from its spirit or essential characteristics. The present embodiments are, therefore, to be considered as illustrative and not restrictive, the scope of the invention being indicated by the claims rather than by the foregoing description. All changes to the invention which come within the meaning and range of equivalents of the claims are therefore intended to be embraced therein.

What I claim is:

1. Apparatus for tensioning an inner diameter blade disposed within said apparatus comprising:

a first annular blade clamping member having a first annular clamping surface for confronting a first side of said blade, a first annular recess disposed radially inwardly of said first clamping surface, a plurality of cylindrical recesses in communication with said first annular recess and disposed in a circular array coaxial with said blade, and a plurality of access openings each connecting one of said cylindrical recesses to the ambient;

a second annular blade clamping member having a second annular clamping surface for confronting a second side of said blade which is opposite said first side of said blade, said second annular clamping surface adapted to be aligned with said first annular clamping surface, and a second annular recess adapted to face said first annular recess;

connecting means extending through said first annular clamping surface, said blade and said second annular clamping surface for securely clamping said first and second annular blade clamping members to each other along said first and second annular clamping surfaces with said blade therebetween thereby preventing any movement of said blade relative to said first and second annular clamping surfaces, said connecting means disposed internal to said first and second annular blade clamping members;

a tensioning ring disposed within said first annular recess, such that said tensioning ring is located radially inwardly of said first and second clamping surfaces and said connecting means, said tensioning ring formed with a protruding portion adapted to abut the portion of said blade located between the associated first and second annular recesses, and said tensioning ring having internal threads at a plurality of locations on the side of said tensioning ring opposite said protruding portion;

a plurality of tensioning screws disposed within said first annular recess with one end of each tensioning screw threadably engaging an associated one of said internal threads of said tensioning ring and the other end of each tensioning screw located within an associated cylindrical recess and being in communication with said ambient through an associated access opening, said tensioning screws having diameters greater than the diameters of said recess openings, and each of said tensioning screws being formed with an internal socket at the end remote from said associated tensioning ring and proximate to said access opening whereby said sockets communicate with the ambient through said access openings to permit movement of said tensioning screws to move said tensioning ring axially to selectively deform said blade into and out of said second annular recess while closing off said cylindrical recess and said first and second annular recess from the ambient.

2. Apparatus as in claim 1 wherein there is provided in each of said cylindrical recesses an annular bearing member against which the end of the tensioning screw remote from said tensioning ring bears.

3. Apparatus as in claim 2 in which said first and said second clamping surfaces are formed with a durable corrosion-resistant plating.

* * * * *